United States Patent [19]

Tripsas

[11] 3,829,628

[45] Aug. 13, 1974

[54] TRUNK CIRCUIT NUMBER PARITY CHECKING

[75] Inventor: Trifon P. Tripsas, Elmhurst, Ill.

[73] Assignee: GTE Automatic Electric Laboratories Incorporated, Northlake, Ill.

[22] Filed: Dec. 26, 1972

[21] Appl. No.: 318,318

[52] U.S. Cl. .......... 179/175.2 R
[51] Int. Cl. .......... H04m 3/22
[58] Field of Search.. 179/175.2 R, 27 DB, 175.2 C, 179/175.24

[56] References Cited

UNITED STATES PATENTS 2,562,362 7/1951 Lomax .......... 179/27 DB
2,866,008 12/1958 Walsh .......... 179/27 DB
3,348,198 10/1967 Winter .......... 179/175.2 R

*Primary Examiner*—Kathleen H. Claffy
*Assistant Examiner*—Douglas W. Olms

[57] ABSTRACT

A test set circuit is disclosed that is arranged to be connected across a trunk circuit of a tributary office for checking the sending of the calling party identity digits and comparing their value with those programmed in the test set. The digit value is displayed while it is being sent and also its sequential position.

5 Claims, 3 Drawing Figures

TRUNK CIRCUIT NUMBER PARITY CHECKING

BACKGROUND OF THE INVENTION

Field of the Invention

This invention relates generally to telephone communication systems, and more particularly to a device for facilitating the testing of a telephone trunk equipment's ability to transmit the proper calling party identity.

DESCRIPTION OF THE PRIOR ART

A toll call originating from a tributary Central Office to a Central Automatic Message Accounting (CAMA) or Traffic Service Position System (TSPS) office requires Automatic Number Identification (ANI) of the calling customer number for billing purposes.

As the calling customer completes dialing, the Central Automatic Message Accounting or Traffic Service Position System office places a request for Automatic Number Identification and prepares to receive and store the Automatic Number Identification. The outgoing trunk of the tributary Central Office involved in the connection, when it receives the Automatic Number Identification request, connects itself to a Register Sender and initiates detection of the calling number.

When the calling number is obtained by the detecting equipment it is extended and stored temporarily within the Register-Sender which immediately begins MF sending to the Central Automatic Message Accounting or the Traffic Service Position System office.

After all the information has been sent and received at the Central Automatic Message Accounting or Traffic Service Position System office, the Register-Sender disconnects from the trunk. The Central Automatic Message Accounting or Traffic Service Position System office having received the called and the calling numbers proceeds and completes the connection.

SUMMARY OF THE INVENTION

Accordingly, it is an object of the present invention to provide a test set for testing tributary trunks to Central Automatic Message Accounting or Traffic Service Position System offices.

This portable test set provides a practical means of testing tributary trunks to Central Automatic Message Accounting or Traffic Service Position System offices. It verifies the accuracy of the send test Automatic Number Identification number, by comparing it digit per digit with a reference number which is programmable and can be set on a program board provided on the test set. Testing tributary trunks to Central Automatic Message Accounting or Traffic Service Position System offices by using the above method is new and is of value to the telephone companies and is of great importance as it simplifies the testing of this type of trunk.

This circuit is part of a test set which tests the operational functions of tributary trunks to CAMA or TSPS offices.

A function of the test set is to verify the accuracy of the ANI (Automatic Number Identification). This verification is accomplished as follows.

At the tributary C.O. there are one or more test numbers which are wired within the C.O. and used as calling numbers for testing purposes.

When testing a trunk, the test set substitutes all of the actions of a calling customer and via leads "C" and "MC" of the trunk under test, is assigned to one of the C.O. test numbers which becomes the calling number of the test set.

During the testing of a trunk the test man dials or keypulses a test termination number at the CAMA or TSPS office.

When dialing or keypulsing is completed, the CAMA or TSPS office places a "request for ANI" of the calling number. The trunk, when it receives this request, attaches itself to a Register-Sender and initiates detection of the calling number. (In this case it will be the test number assigned to the MC lead of the trunk under test). As soon as detection is completed, the Register-Sender MF sends the number via the trunk to the CAMA or TSPS office, which after it receives all the data proceeds and completes the call.

This circuit when used for testing tributary trunks to CAMA or TSPS offices, verifies that the ANI of the calling number (the C.O. test numbers in this case) has been sent accurately to the remote CAMA or TSPS office. By selecting a variety of test numbers all the possible combinations of the WXYZ and the 2/6 MF tones can be tested.

In case of discrepancies the failure is displayed on lamps indicating to the test man the exact nature of the failure. This type of testing is of great importance as the ANI of a calling customer's number sent to CAMA or TSPS office is used for billing purposes.

BRIEF DESCRIPTION OF THE DRAWINGS

These features and other advantages of this invention will be readily appreciated, as the same becomes better understood by reference to the following detailed description when considered in connection with the accompanying drawings.

DESCRIPTION OF THE PREFERRED EMBODIMENT

In every central office there are certain numbers reserved for test purposes in the various types of equipment used within the office. Among such numbers is a number in the CAMA or TSPS office which when accessed will respond to the calling trunk with an instruction to forward the calling number identity without causing this number and call to be recorded for billing purposes.

Figure 1:
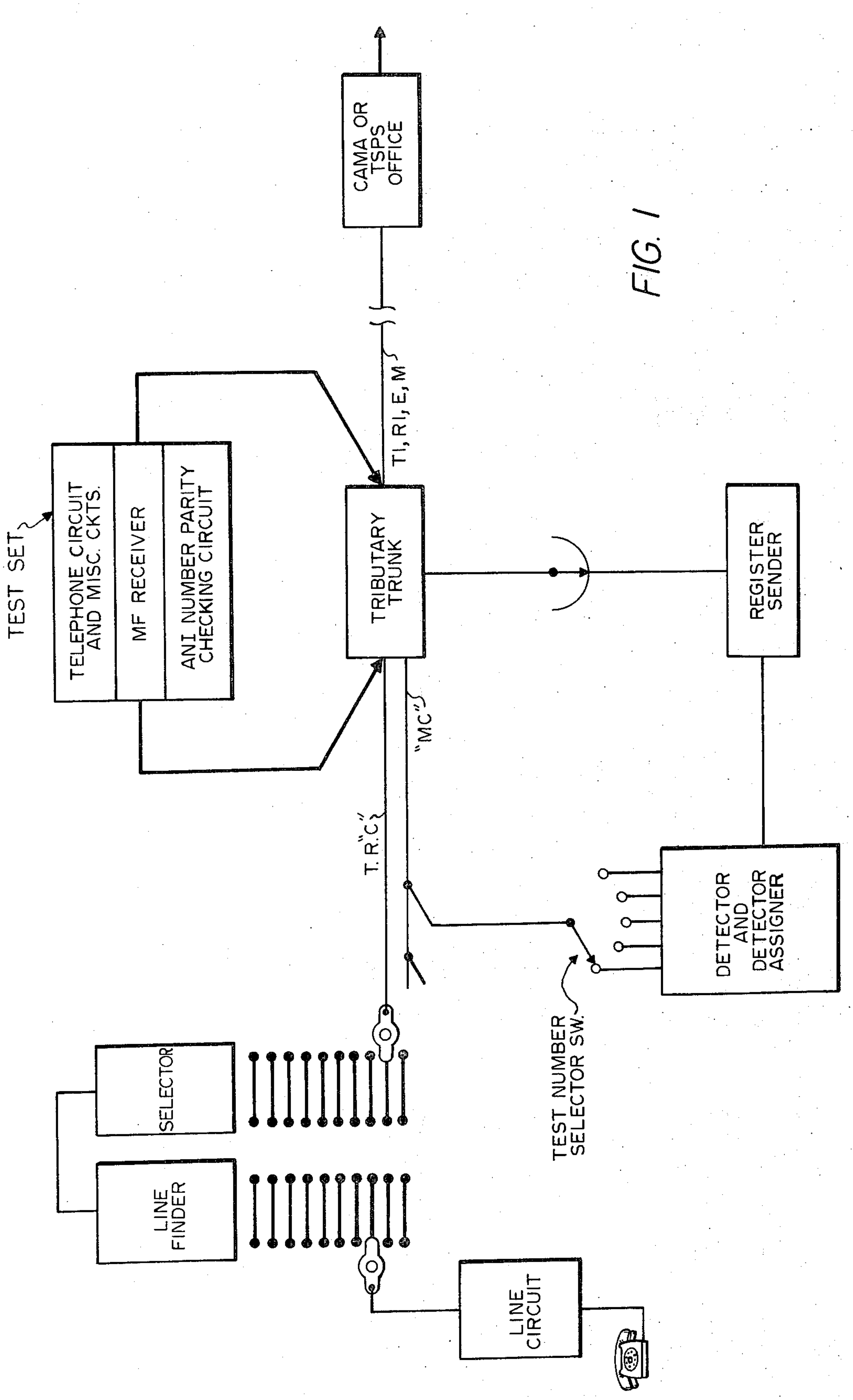
FIG. 1 is a schematic block diagram showing how the test set of the present invention is connected to a tributary office trunk circuit.
Figure 2:
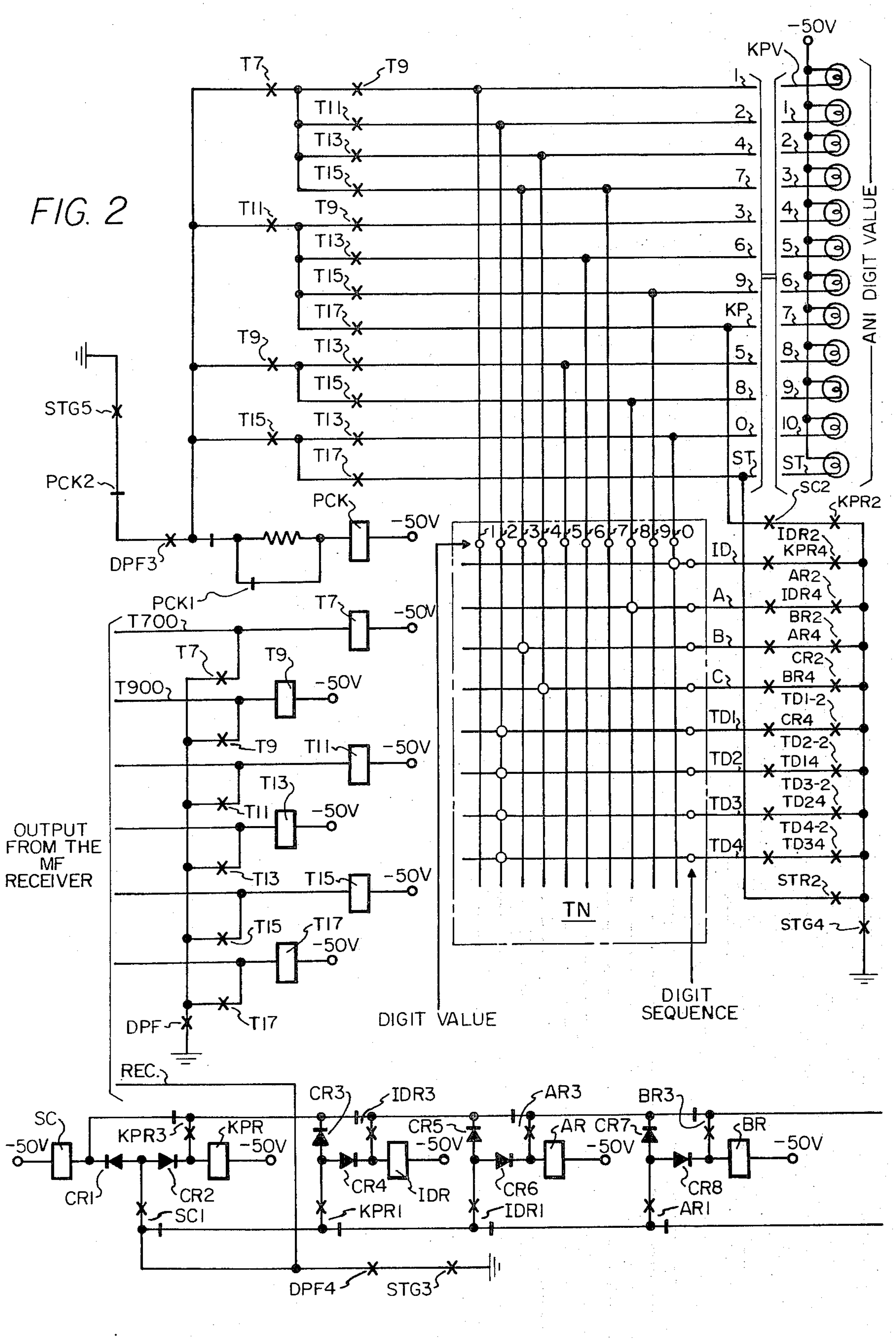
FIGS. 2–3 are schematic circuit diagrams of the test set according to this invention.
Figure 3:
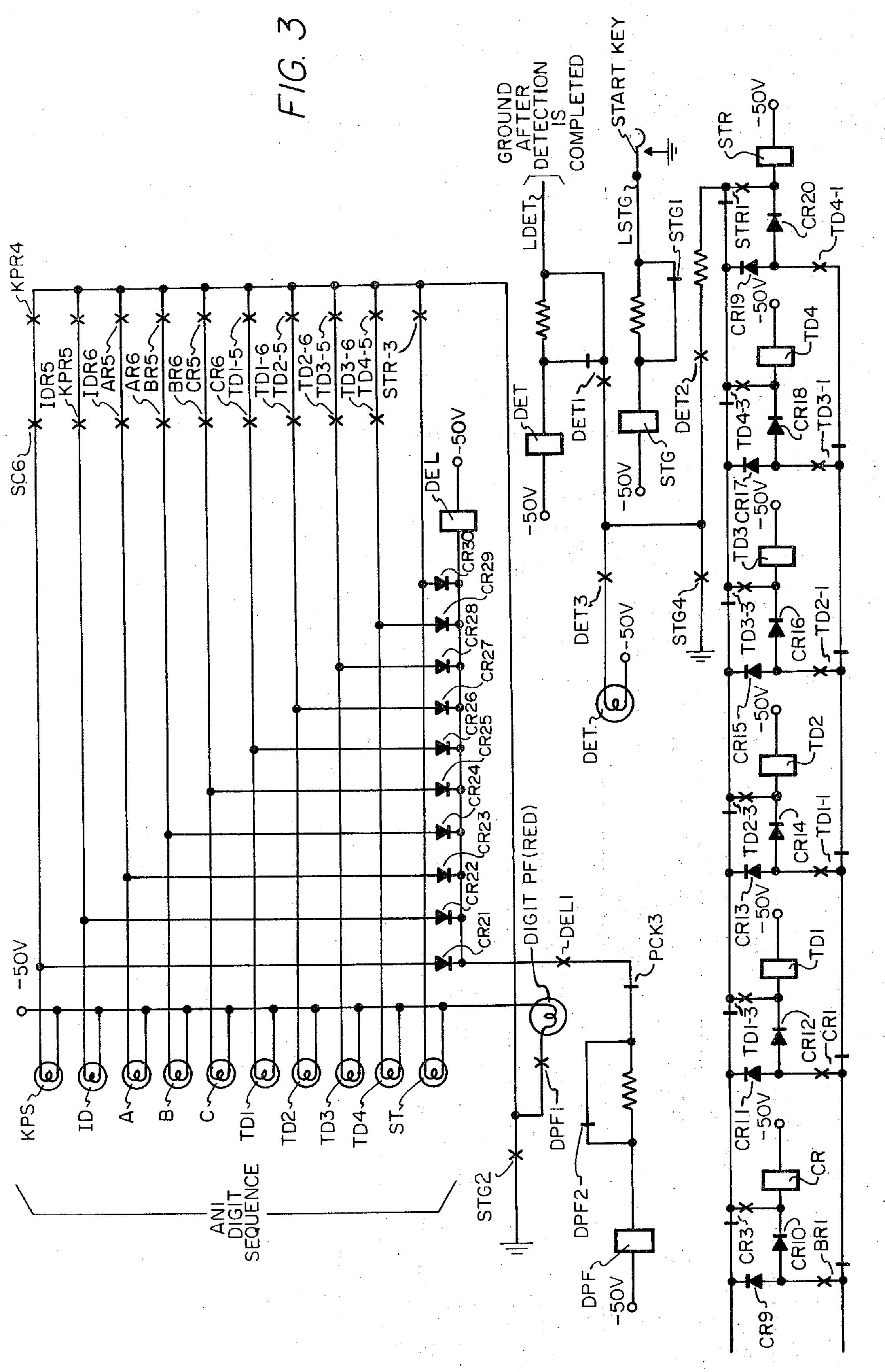

Another such test number is reserved in the branch office for the calling line detector equipment testing. Provision is made to select a particular one of those numbers, such as by the test number selector switch of FIG. 1. This same test number is also set up on the matrix TN and the test unit is then connected to this number terminal, also a test telephone is connected to the input terminals of the trunk circuit it is desired to test. The output terminals of the trunk circuit are connected to the input of the multifrequency receiver. With these preliminary arrangements made, the test operator has then to activate the start key and depending on the type of trunk signalling used to dial or keypulse the TSPS or CAMA office test access number from the test telephone, the circuit of the present disclosure begins to operate.

The actuation of the locking start key applies a ground potential to operate the relay STG which locks to this ground potential. During the interval that the test operator is dialing the digits necessary to access the CAMA office no other action takes place within this circuit. But upon accessing the CAMA office a signal is returned to the trunk circuit of this office requesting the identification of the calling party. This signal causes the local station identification equipment to operate and to supply a signal to the lead DET to operate relay DET. Operation of relay DET completes the path for ground potential to the group of sequence control relays SC, KPR, 1DR, AR, BR, CR, TD1, TD2, TD3, TD4 and STR. The operation of relay SC (start count) completes a path for ground potential from lead REC to thereby advance the sequence relays. The local exchange equipment at this time is beginning to send the local calling subscriber identification digits (ANI) by the use of two-out-of-six tones to the CAMA office. These tone signals are monitored by the receiver which applies a ground potential signal to the two-out-of-six leads corresponding to these frequencies to operate those of the six corresponding relays of the group T7, T9, T11, T13, T15 or T17. Simultaneously with the receipt of the signals on the above leads the receiver applies a ground potential to the lead REC, which potential causes the operation of relay KPR via the contacts SC1 of the relay SC. The simultaneous operated state of sequence relays SC and KPR completes a path for ground potential via contacts STG4, KPR2 and SC2 to a lamp KPV of the digit value field of lamps, to a lamp KPS of the digit sequence field of lamps and relay DEL via contacts SC6 and KPR4 and also to the contacts of one of the two relays of the group corresponding to the frequencies used for sending the ANI information. In this particular case to the contacts of relay T17, which along with relay T11 should have been operated if the proper frequencies were sent to the CAMA office. The operation of relays T17 and T11 completes an operating path to relay PCK (Parity Check). Should the wrong value of tones be sent via the trunk, others of the relays T9 through T17 would be operated and an incomplete path to relay PCK results in its remaining unoperated. The resultant unoperated state of contacts PCK3 with the closed contacts DEL1 completes an operating path to relay DPF. The operation of relay DPF causes the lighting of lamp PF (Parity Failure) via contacts DPF1, the closing of a ground potential via contacts DPF3 to the digit value field of lamps to lock in whatever information was sent and to lock the sequence relays in their existing state via contacts DPF4.

Circuit Operation

When the test man connects the test set to a trunk to perform functional tests, he selects an office test number and sets that number on the program board by inserting shorting pins in the vertical rows and on the respective numerical value for each digit. The example on the circuit print shows the expected ANI to be as follows:

| | | |
|---|---|---|
| Start Code | KP | KP |
| Identification Digit | ID | 0 |
| Office Prefix | A | 8 |
| | B | 3 |
| | C | 4 |
| Terminal Digits | TD1 | 2 |
| | TD2 | 2 |
| | TD3 | 2 |
| | TD4 | 2 |
| Stop Code | ST | ST |

Since each ANI transmission starts with a KP code and ends with an ST code, these codes are hard wired bypassing the program board.

At the start of testing relay STG (Start Ground) operates and provides the operational grounds. During testing an MF receiver is attached on the outgoing "tip" and "ring" of the trunk. The 2/6 ground outputs of the MF receiver extended to the T7–T17 relays. The MF receiver also grounds lead REC simultaneously with the 2/6 ground on the T7–T17 leads. When the CAMA or the TSPS office requests ANI, the trunk initiates detection and ground lead DET closing a circuit to relay DET. Relay DET operates, locks, lights lamp DET and closes a circuit to relay SC (Start Counting). Relay SC operates and prepares the counting chain.

Receiving and Comparing the KP Code Operation with Correct KP Code

When the MF receiver detects code KP, it grounds leads T1100, T1700 and REC closing paths to relays T11, T17 and KPR. The operation of the above relays causes the following:

a. A circuit is closed to lamp KPV of the (digit value group of lamps) lighting lamp KPV
b. A circuit is closed to relay PCK (Parity Check) operating relay PCK
c. A circuit is closed to lamp KPS of the (digit sequence group of lamps) lighting lamp KPS
d. A circuit is closed to relay DEL (Delay) operating relay DEL.

Relay PCK operates and opens the operating path of relay DPF (Digit Parity Failure). Relay DEL operates and causes no action at this time.

When the duration of the KP tones (1,100 Hz and 1,700 Hz) ends, ground potentials are removed from leads T1100, T1700 and REC opening the paths and restoring relays T11, T17 and SC. When these relays restore, they open the circuit to relays PCK and DEL causing them to restore and also to remove ground from lamp KPV (Digit Value) and lamp KPS (Digit Sequence).

Operation with Incorrect Code

If instead of the expected KP code a different 2/6 code appears, the operation of the circuit is as follows:

The MF receiver extends its outputs to the leads T7–T17 and lead REC to cause the following:

Lamp KPV (Digit Value), Lamp KPS (Digit Sequence) and relay DEL, are operated. The circuit to relay PCK remains open as the only path on this sequence is via the springs of relays T17 and T11. Relay DEL operates and closes a path to relay DPF (Digit Parity Failure). Relay DPF operates. Its operation closes the following circuits:

a. Transfer the 2/6 code decoding tree consisting of the springs of the T7-T17 relays, from relay PCK to ground. At this time a second lamp on the "Digit Value" row, corresponding with the 2/6 code actually received lights.
b. Locks the operated T7-T17 relays.

c. Connects direct ground on lead REC preventing the sequence circuit from advancing.

d. Closes and lights lamp Digit PF (Digit Parity Failure).

At this time the following information is displayed to the test man.

1. The digit PF lamp indicates digit parity failure.
2. The digit sequence lamp indicates the sequence in which the failure occurred.
3. At the Digit Value row, there will be two lamps lighted; the KPV lamp which will indicate the 2/6 code received instead of the proper KP code.

With the above information available, the test man can locate and correct the source of the trouble. All the operated relays restore when the test man operates a key at the test set removing ground from lead STG.

Comparing the ID Digit Operation with Correct Code (0 in the Example, Operated Relays: STG, DET, KPR)

When the MF receiver detects the "0" code, it grounds leads T1300, T1500 and REC closing operate paths to relays T13, T15 and DR.

The operation of the above relays causes the following:

a. A circuit is closed to lamp "0," via the crosspoint IDX0 on the program board, lighting lamp "0" (Digit Value).

b. A circuit is closed to relay PCK, via the crosspoint IDX0 and T13–T15, to operate relay PCK.

c. A circuit is closed to lamp ID (Digit Sequence) lighting lamp ID.

d. A circuit is closed to relay DEL to operate relay DEL.

Relay PCK operates and opens the operating path of relay DPF. Relay DEL operates and causes no action at this time. When the duration of "0" code tones (1,300 Hz and 1,500 Hz ends, grounds are removed from leads T1300, T1500 and REC opening and restoring relays T13, T15 and KPR. When these relays restore, they open the circuits to relays PCK and DEL causing them to restore and also remove ground from lamps "0" (Digit Value) and ID (Digit Sequence).

This circuit now is ready to check the "A" digit parity. The operation for the "A" digit and for the ones to follow is similar to the one previously described except different ones of the T7–T17 relays corresponding with the digits expected, operate and also each time ground is applied and then removed from the REC lead to cause the relay sequence chain to advance one step. The "ST" code at the end of the ANI number bypasses the program board the same way as for the KP code. When the ANI number has been compared for parity and the ST code ends, relay STR locks and remains operated until ground is removed from lead STG. Lamp STV (Digit Value) and STV (Digit Sequence) will remain on until relay STR restores.

Operation with Incorrect Code (Operated Relays: STG, DET, KPR)

If instead of the expected code for digit "0" (T1300 and T1500) a different digit code appears, as an example assume digit code "9" (T1100 and T1500), then the operation of the circuit is as follows:

At the time the MF receiver extendsiits output to leads T1100, T1500 and REC, closing the following circuits:

a. Relays T11, T15 and IDR operate.

b. Lamp ")" (Digit Value) lights from ground via the crosspoint IDX0 of the program board.

c. Lamp ID (Digit Sequence) lights and relay DEL is operated.

The circuit to relay PCK remains open as the only path on this sequence is via the contacts of relays T13 and T15. When relay DEL operates it closes a path to relay DPF. The operation of relay DPF closes the following circuits:

a. Transfers the code decoding tree consisting of the springs of the operated T7–T17 relays, from relay PCK to direct ground.

b. At this time ground via the contacts of relays T11 and T15 closes a path and lights lamp 9 (Digit Value). This lamp is in addition to lamp "0" and indicates the wrong digit received.

c. Direct ground is connected to lead REC preventing the chain circuit from advancing.

e. Lamp DPF lights indicating that digit parity failure has occurred. With the above information available to the test man the source of the trouble can be located and corrective action can take place.

What is claimed is:

1. In a multi-office telephone system including a ticketing office and at least one branch office wherein said branch office includes calling line designation identifying means and means for forwarding said calling line designation identity via interoffice trunks as coded multi-tone signals, an arrangement for testing said means for fowarding said identity comprising: a multi-tone receiver operatively connected to one of said trunks, a first means for partially completing a circuit means to a failure indicating means, a first control means operated from said receiver to further the completion of said circuit means, a program board coding means for storing the calling line designation, a sequencing control means operated upon receipt of a part of said calling line designation from said trunk to complete a second means to said first means, said failure indicating means operably connected to said sequencing control means via said second means, and a third means operated upon coincidence of said program board coding means and responsive to said coded multi-tone signals, and said sequencing control means to disable said failure indicating means.

2. In a multi-office telephone system as claimed in claim 1 wherein said arrangement includes a digit value field of lights having a light corresponding to each of the values of the calling line designation used, and means including said sequencing control means and said program board coding means operated to light a particular light corresponding to the value of calling line designation that should be received.

3. In a multi-office system as claimed in claim 2 wherein said arrangement includes fourth means including said digit decoding means operated upon an erroneous part of a calling line designation having been forwarded for lighting a second lamp of said part of a calling line designation value field of lamps to indicate said erroneous digits value.

4. In a multi-office system as claimed in claim 3 wherein said arrangement includes fifth means including said decoding means and said failure indicating means operated upon an erroneous part of a calling line designation having been forwarded to disable said sequencing control means

5. In a multi-office system as claimed in claim 4 wherein said arrangement includes a digit sequence value field of lights having a light corresponding to each part of the calling line designation sequence positions that is used in the calling line designation of said calling line identity operated from said sequence control means.

* * * * *